United States Patent
Zulauf et al.

(10) Patent No.: US 9,803,783 B2
(45) Date of Patent: Oct. 31, 2017

(54) HAND TIGHTENED HYDRAULIC FITTING

(71) Applicant: GATES CORPORATION, Denver, CO (US)

(72) Inventors: Keith E. Zulauf, Castle Rock, CO (US); Donald R. Gilbreath, Castle Rock, CO (US); Randall Mark Leasure, Monument, CO (US); Richard A. Eaton, Sedalia, CO (US)

(73) Assignee: Gates Corporation, Denver, CO (US)

( * ) Notice: Subject to any disclaimer, the term of this patent is extended or adjusted under 35 U.S.C. 154(b) by 0 days.

(21) Appl. No.: 13/675,109

(22) Filed: Nov. 13, 2012

(65) Prior Publication Data

US 2013/0161941 A1      Jun. 27, 2013

Related U.S. Application Data

(60) Provisional application No. 61/580,269, filed on Dec. 26, 2011.

(51) Int. Cl.
| | | |
|---|---|---|
| *F16L 21/08* | (2006.01) | |
| *F16L 19/00* | (2006.01) | |
| *F16L 19/02* | (2006.01) | |

(52) U.S. Cl.
CPC .............. *F16L 21/08* (2013.01); *F16L 19/005* (2013.01); *F16L 19/02* (2013.01);
(Continued)

(58) Field of Classification Search
CPC ......... F16L 19/005; F16L 19/02; F16L 21/08; F16L 2201/10; Y10T 29/49815; Y10T 29/49948; Y10T 29/5367
(Continued)

(56) References Cited

U.S. PATENT DOCUMENTS 904,673 A * 11/1908 Bideker .............. F16L 27/0812
                                                              137/801
2,880,019 A    3/1959 Wurtz et al.
(Continued)

FOREIGN PATENT DOCUMENTS

| DE | 3743170 C1 | 5/1989 |
| FR | 1221842 A | 6/1960 |

(Continued)

OTHER PUBLICATIONS

Canadian Intellectual Property Office, A Requisition by the Examiner in Accordance With Subsection 30(2) of the Patent Rules, application No. 2,859,196; mailing date Mar. 1, 2016.
(Continued)

*Primary Examiner* — Gregory J Binda
*Assistant Examiner* — Zachary T Dragicevich
(74) *Attorney, Agent, or Firm* — Paul N. Dunlap, Esq.; Jeffrey A. Thurnau, Esq.

(57) ABSTRACT

This disclosure relates generally to hose couplings useful for mining applications, more particularly to a fluid coupling capable of generally fully tightened by hand, including a visual lock for visual indication and safety when in a hand-tightened position. The coupling generally includes a male portion, a female portion, a retaining member and a locking member. The male portion passes through the retaining member, and the retaining member threadingly engages the female member. The locking member prevents unthreading of the retaining member from the female member.

35 Claims, 6 Drawing Sheets

(52) U.S. Cl.
CPC ...... *F16L 2201/10* (2013.01); *Y10T 29/49815* (2015.01); *Y10T 29/49948* (2015.01); *Y10T 29/5367* (2015.01)

(58) Field of Classification Search
USPC ....... 285/80, 81, 321, 91, 93, 281, 386, 354, 285/92, 333, 334, 319, 305, 82; 411/517, 411/353, 945, 992; 429/1; 403/315, 319, 403/320, 342, 343
See application file for complete search history.

(56) References Cited

U.S. PATENT DOCUMENTS

| | | | |
|---|---|---|---|
| 3,201,149 A | | 8/1965 | Bragg |
| 3,332,710 A | * | 7/1967 | Doty ............................ 285/336 |
| 3,446,245 A | | 5/1969 | Snyder, Jr. |
| 3,615,109 A | | 10/1971 | Brinda et al. |
| 4,043,575 A | * | 8/1977 | Roth ............................. 285/90 |
| 4,068,866 A | * | 1/1978 | Saha ............................. 604/390 |
| 4,135,742 A | * | 1/1979 | Anderson ....................... 285/87 |
| 4,165,106 A | * | 8/1979 | Gladden ......................... 285/39 |
| 4,776,618 A | | 10/1988 | Barree |
| 4,801,160 A | * | 1/1989 | Barrington ...................... 285/81 |
| 4,802,695 A | * | 2/1989 | Weinhold ............ F16L 19/0206 285/148.19 |
| 4,919,456 A | * | 4/1990 | Wong ..................... E21B 33/03 285/334.2 |
| 5,060,988 A | | 10/1991 | Williamson |
| 5,131,695 A | * | 7/1992 | Wiser ............................ 285/354 |
| 5,188,398 A | | 2/1993 | Parimore, Jr. et al. |
| 5,348,349 A | * | 9/1994 | Sloane ............................ 285/92 |
| 5,498,042 A | * | 3/1996 | Dole .................... F16L 37/148 285/148.27 |
| 5,678,607 A | | 10/1997 | Krywitsky |
| 5,725,259 A | | 3/1998 | Dials |
| 5,882,044 A | * | 3/1999 | Sloane ................. F16L 19/005 285/92 X |
| 6,578,881 B2 | * | 6/2003 | Lynn et al. .................... 285/354 |
| 6,818,076 B1 | * | 11/2004 | Farzin-Nia ................... 148/421 |
| 6,976,817 B1 | * | 12/2005 | Grainger ....................... 411/204 |
| 7,195,288 B2 | | 3/2007 | Weinhold |
| 2003/0184083 A1 | * | 10/2003 | Linam et al. ................... 285/45 |
| 2004/0061331 A1 | | 4/2004 | Murken |
| 2005/0056066 A1 | * | 3/2005 | Defranks et al. ............... 72/133 |
| 2006/0186188 A1 | * | 8/2006 | Belanger ........................ 232/38 |
| 2007/0123883 A1 | * | 5/2007 | Ellis et al. ..................... 606/69 |
| 2012/0086201 A1 | | 4/2012 | Murken |

FOREIGN PATENT DOCUMENTS

| | | |
|---|---|---|
| JP | 53-105718 A | 9/1978 |
| UA | 1902 U | 7/2003 |
| UA | 25610 U | 8/2007 |

OTHER PUBLICATIONS

Australian Government IP Australia, Patent Examination Report No. 3, Patent Application No. 2012362800, dated Apr. 22, 2016.

* cited by examiner

HAND TIGHTENED HYDRAULIC FITTING

CROSS-REFERENCE TO RELATED APPLICATION

This application claims the benefit of U.S. Provisional Application No. 61/580,269, filed Dec. 26, 2011, also entitled "Hand Tightened Hydraulic Fitting," which is hereby incorporated herein by reference in its entirety.

BACKGROUND

This disclosure relates generally to hose couplings for mining and other applications, more particularly to a fluid coupling capable of being fully tightened by hand, including a visual lock.

SUMMARY

The present disclosure is directed to systems and methods which provide a threaded hydraulic fluid coupling capable of being hand-tightened. The coupling system may also include a visual lock feature which may allow for visual indication that the coupling system is coupled.

Threaded hydraulic connections may not be preferred in dirty environments such as mining applications. Water and grime may cause some threads to bind up and/or rust together. Grime may also affect frictional characteristics such that, even with the proper torque applied, there may be inadequate preload to overcome the pressure load. Typical threaded fittings may have no visual indication as to whether they have adequate torque applied.

However, there may be advantages to threaded connections because they may be able handle impulse applications very well, they may make a very solid connection, and they may leak rather than blow off if inadvertently disconnected while under pressure.

Non-threaded terminations such as the staple lock design may be difficult to insert and remove since there is no mechanical advantage available to overcome the inherent resistance involved with cylindrical seals. Also, rust and grime, as well as damage to the flange and staple may often cause binding.

What is needed is a coupling system that is relatively easy to attach (for example, by hand), and may be able to handle impulse applications. The present invention is directed to systems and methods which meet these needs.

The invention is directed to a coupling system with a male portion, a female portion, a hand-tightenable threaded retaining member which draws said male portion and said female portion into sealing engagement when threadingly engaged, and a locking member which locks said hand-tightened retaining member to prevent it from unthreading. In one embodiment, the retaining member has internal threads, the female portion has corresponding external threads which so threadingly engage, and the retaining member has an abutment portion that abuts a boss of the male portion and thereby draws the male portion into sealing engagement with the female portion. In another embodiment, the retaining member has internal threads, the male member has corresponding external threads which so threadingly engage, and the retaining member has an abutment portion that abuts a boss of the female portion and thereby draws the female portion into sealing engagement with the male portion.

The male portion has an insert portion configured to generally matingly couple to a receptacle portion of the female portion of the coupling system. There is generally a seal between the insert portion and the receptacle portion. The seal may be an O-ring, which may seat in a groove on the male insert portion or on the female receptacle portion.

The assembly of the coupling system can generally be done by hand. Once assembled and hand tight, the locking member is inserted which prevents the retaining member from disengaging, backing off or unthreading. The locking member provides a visual indication the coupling is secured in a hand-tight position. The coupling parts can be provided with wrenching portions to assist hand assembly or disconnecting, or to assist attachment to hydraulic fittings if necessary.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The accompanying drawings, which are incorporated in and form part of the specification in which like numerals designate like parts, illustrate embodiments of the present disclosure and together with the description, serve to explain the principles of the disclosure. In the drawings.

DETAILED DESCRIPTION

Figure 1:
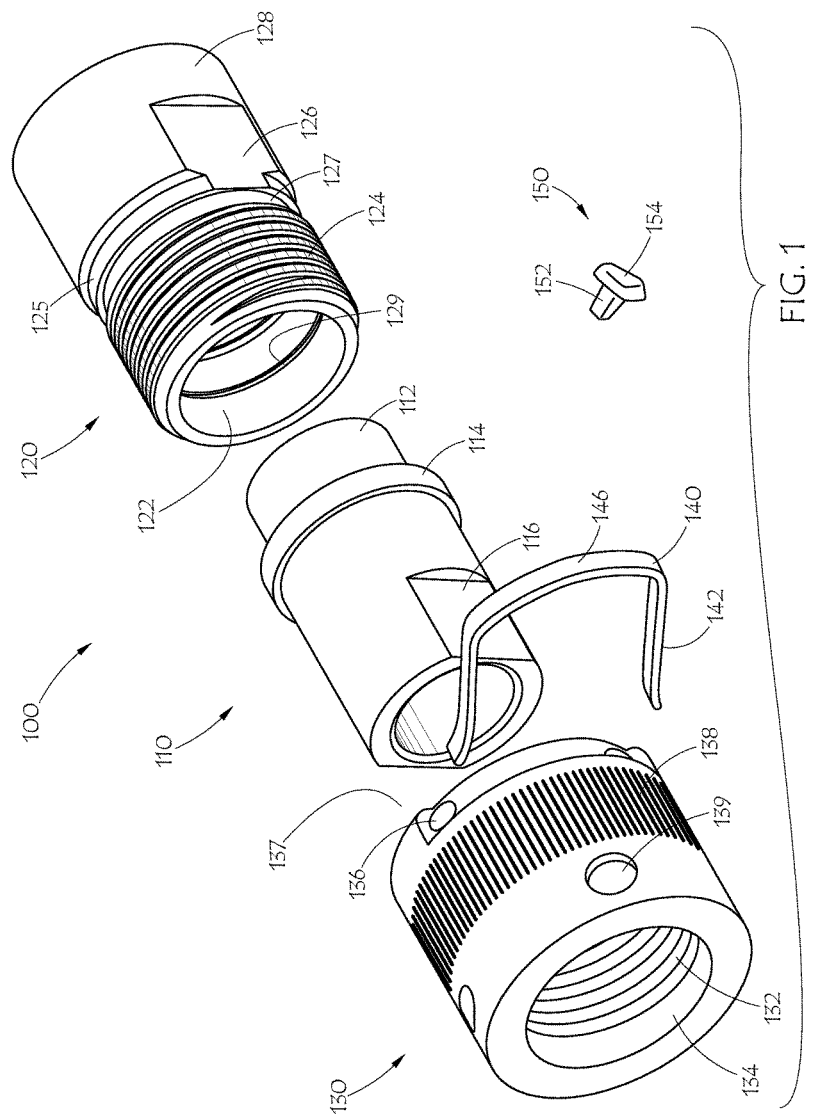
FIG. 1 is an exploded view of a coupling system according to an embodiment.

According to an embodiment, a coupling system 100 is shown in FIG. 1. Coupling system 100 may include a male portion 110, a female portion 120, a retaining member 130, and a locking member 140. An alternate locking member 150 may also be included in the system 100.

According to embodiments, male portion 110 may include an insert portion 112, a boss 114, and a hose receiving portion 116. Female portion 120 may include a receptacle portion 122, threads 124, a ridge 125, a wrenching section 126, locking groove 127, and connection portion 128. Retaining member 130 may include threads 132, an abutment portion 134, retainer orifice(s) 136, a lip 137, knurling 138 and a wrenching section 139.

Insert portion 112, of male portion 110 may be capable of generally coupling with receptacle portion 122 of female portion 120 in a non-interference-type fit. Boss 114 may then generally provide a stop or may be adjacent to or abut female portion 120. There may be created a seal between male portion 110 and female portion 120, preferably between their cylindrical surfaces. This may allow fluid to pass therebetween.

Female portion 120 may also include a seal groove 129, which may be capable of retaining a seal such as an O-ring (not shown). This may be one configuration which may enhance the sealing ability of the coupling system 100. Alternately, a seal groove capable of retaining a seal such as an O-ring may be included on male insert portion 112. Optionally, dust seal(s) (not shown) may be included, for example near ridge 125 or groove 127 or near abutment portion 134, for example, in order to keep foreign matter out of the threads. It should be understood that ridge 125, aspects of groove 127, and lip 137 are optional and may be omitted or reconfigured as desired provided the requisite locking functionality is present.

Retaining member 130 may then generally slide over male portion 110, such that threads 132 of retaining member 130 may engage corresponding threads 124 of female portion 120. Male portion 110 may generally extend through retaining member 130. Boss 114 of male portion 110 may then be in contact with abutment portion 134 of retaining member 130. This may secure together male portion 110, female portion 120 and retaining member 130, and may enhance the sealing between male portion 110 and female portion 120. Once male portion, female portion 120 and retaining member 130 are generally secured together, extension(s) 142 of locking member 140 may extend through retainer orifice(s) 136 of retaining member 130 and engage female portion 120 at locking groove 127 such that retaining member may not uncouple from female portion 120.

Retaining member 130 may be hand tightened, but if there is an application that requires the male portion 110 and female portion 120 to be locked against a possible live swivel, torque may be applied to retaining member 130 similar to other threaded connection systems and methods. For a faster connection, multiple-start threads may be used.

According to embodiments, locking member 140 may include an indication portion 146 which may be made to be a visible color such as red, to indicate the coupling system 100 is engaged. This may be used as a safety indicator, and/or lockout to indicate if the coupling system is engaged and able to withstand pressure.

Furthermore, locking member 140 may be of different configurations, such as locking member 150. Locking member 150 may include an extrusion 152 which may be capable of extending through a retainer orifice 136 to engage locking groove 127 of female portion 120 to generally secure retaining member 130 to other portions of the system. Locking member 150 may also include indication portion 154 which be made to be a visible color and/or configuration such as red, to indicate the coupling system 100 is engaged, for safety and/or other reasons.

In various embodiments, the locking member may be in the form of a special clip, staple, a snap-in button, or a wire threaded through the nut. This locking feature may not be able to be applied until the threads are fully-engaged, so it may be very clear by visual inspection as to whether a connection is properly made.

Figure 5:
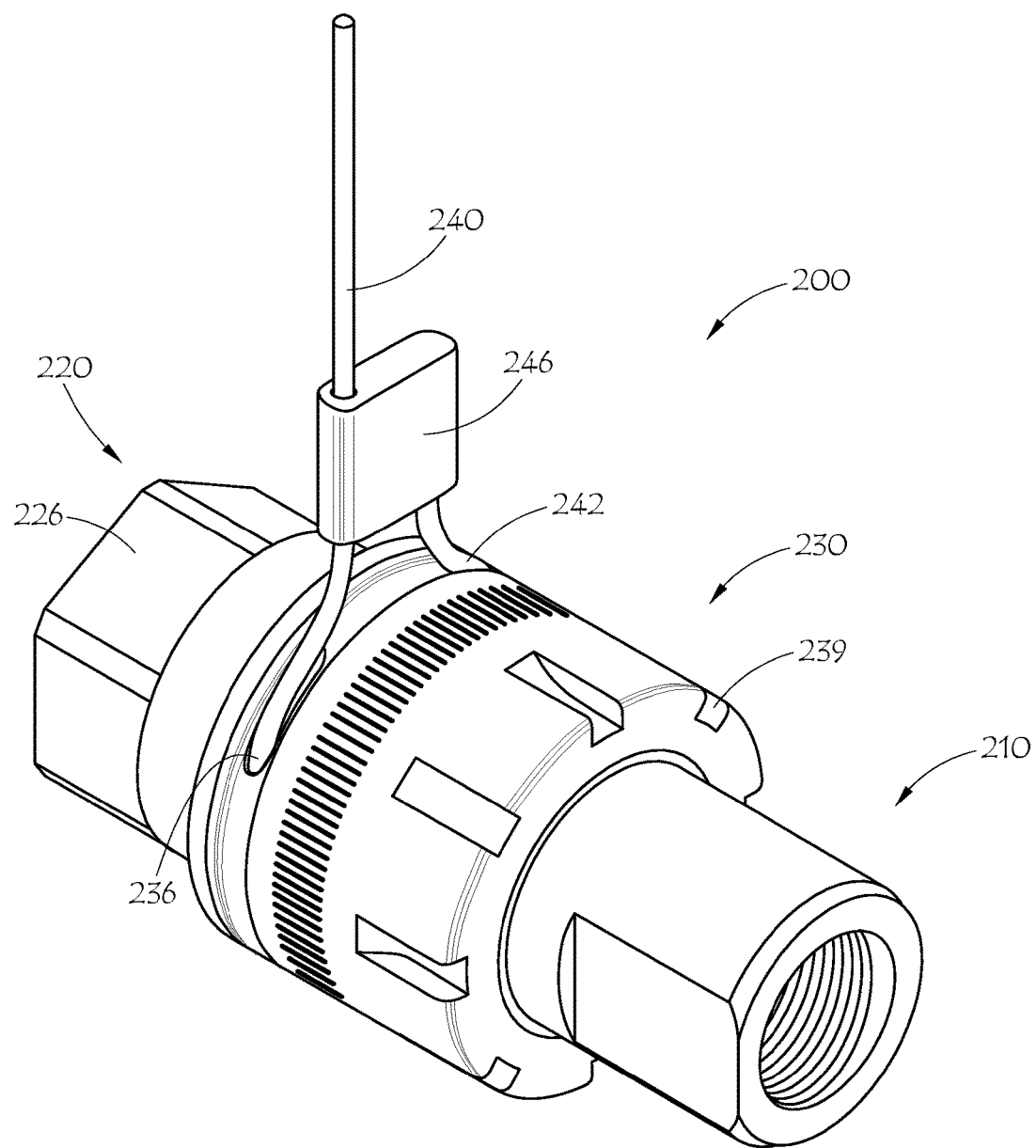
FIG. 5 is a perspective view of a coupling system according to another embodiment.

In another embodiment shown in FIG. 5, holes 236 may be drilled or formed roughly tangent to locking groove 127 within the retaining member 230. A plastic or metal wire tie 240, or other locking member may be threaded through the holes 236, engaging both locking groove 127 and a locking groove in retaining member 230 (not visible) thereby keeping the retaining member from backing off and providing a visual indication of a proper connection. The wire cable tie 240 shown in FIG. 5 is in the form of a cable seal which may be designed for single use (cut to remove) or multiple use. Seal or tag 246 provides further visual indication of a proper connection and may be labeled for various identification or record-keeping purposes. Likewise other kinds of metal or plastic ties or seals may be utilized which may be for single or multiple use, with or without an identification tag, In an embodiment, coupling system 100 may be a coarse-thread connector which may be hand-tightened, having a locking feature that keeps retaining member 130 from backing off, and may further provide a visual indication of a proper connection via indication portion 146, 154, 246 of locking member 140, 150, 240. Because the seal is generally along a cylinder, or between two cylinders, preload may not be required in the retaining member 130, and it may not have a torque load requirement. Thus hand-tightening is sufficient to fully engage the coupling and withstand the design pressure.

Once tightened, a visible locking feature (locking member 140, 150, 240) may be applied. Therefore, this coupling system 100 may provide a visual indicator of a proper connection. An advantage is a threaded retaining member 130, which provides a mechanical advantage to draw the sealing cylinder in and out of female portion 120 for connection and removal.

Male portion 110 may include a hose receiving portion 116, which may be capable of receiving, and coupling to, a hose, manifold or other system or apparatus. In the embodiment of attaching to a hose, hose receiving portion 116 may be generally in the form of a barb or other configuration capable of coupling to a hose. Portion 116 may also include a wrenching section to allow torque to be applied to the male portion 110.

Female portion 120 may also include a connection portion 128 which may be capable of coupling to a hose or manifold or other suitable structure. It will be appreciated that connection portion 128 may be of many forms to couple to various hoses and other structures. Female portion 120 may also include a wrenching portion 126 to allow torque to be applied to the female portion 120.

Retaining member 130 may also include knurling 138 or similar surface modification, which may enhance gripping and turning of retaining member 130, especially during hand tightening. Retaining member 130 may also include wrenching adaptations such as a hex, holes, slots, flats, or orifice(s) 139 as shown, which are capable of receiving a wrench or other tool used to tighten/loosen and/or generally apply torque to said retaining member.

Figure 2:
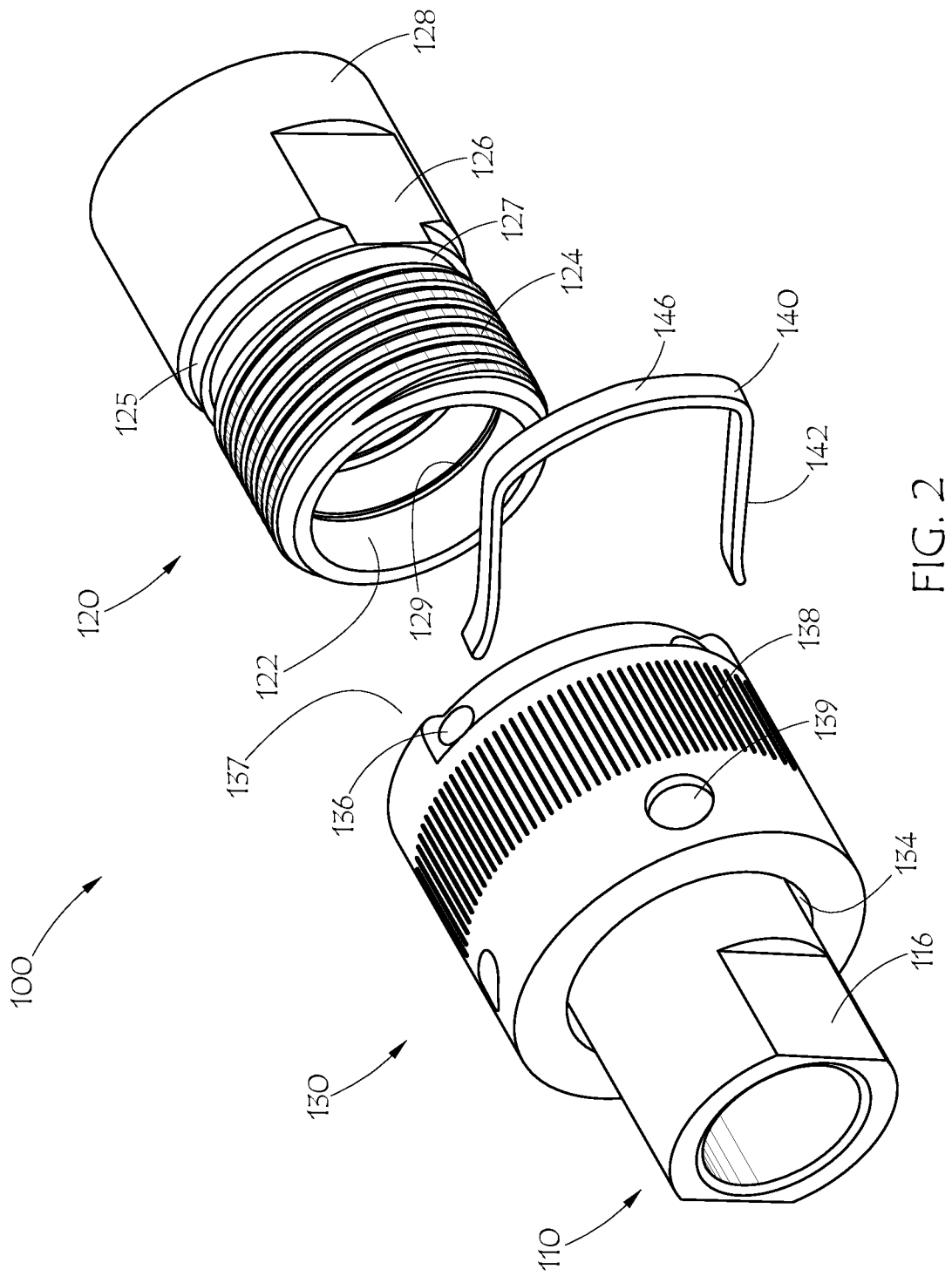
FIG. 2 is a partially exploded view of a coupling system according to an embodiment.
Figure 3:
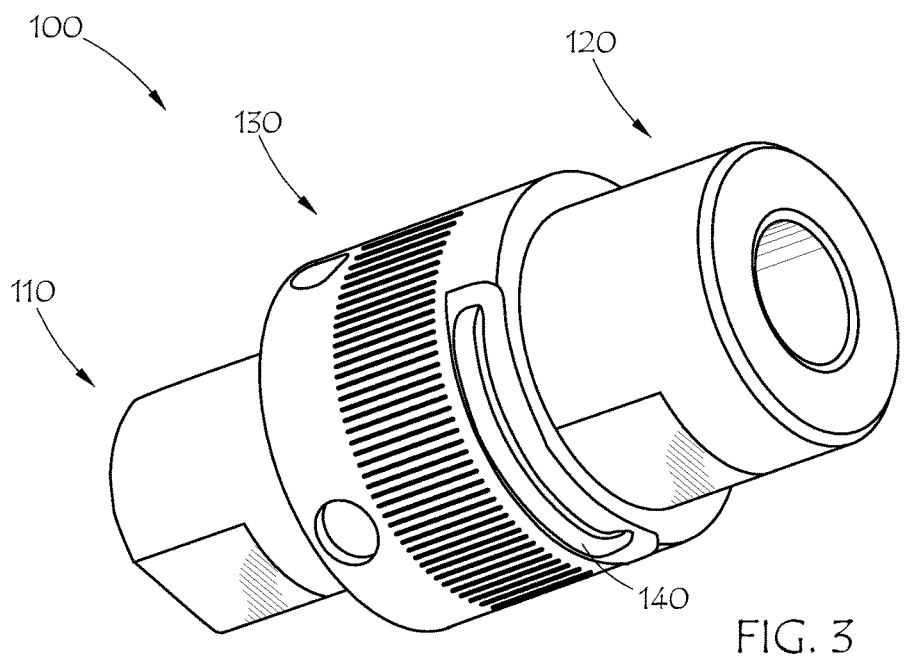
FIG. 3 is a perspective view of a coupling system according to an embodiment.

FIG. 2 shows coupling system 100 with retaining member 130 slid over male portion 110, before coupling to female portion 120. FIG. 3 shows coupling system 100 fully engaged with retaining member 130 coupling together with male portion 110 and female portion 120, with locking member 140 extending through retainer orifices 136 and engaging locking groove 127 (not shown).

Figure 4:
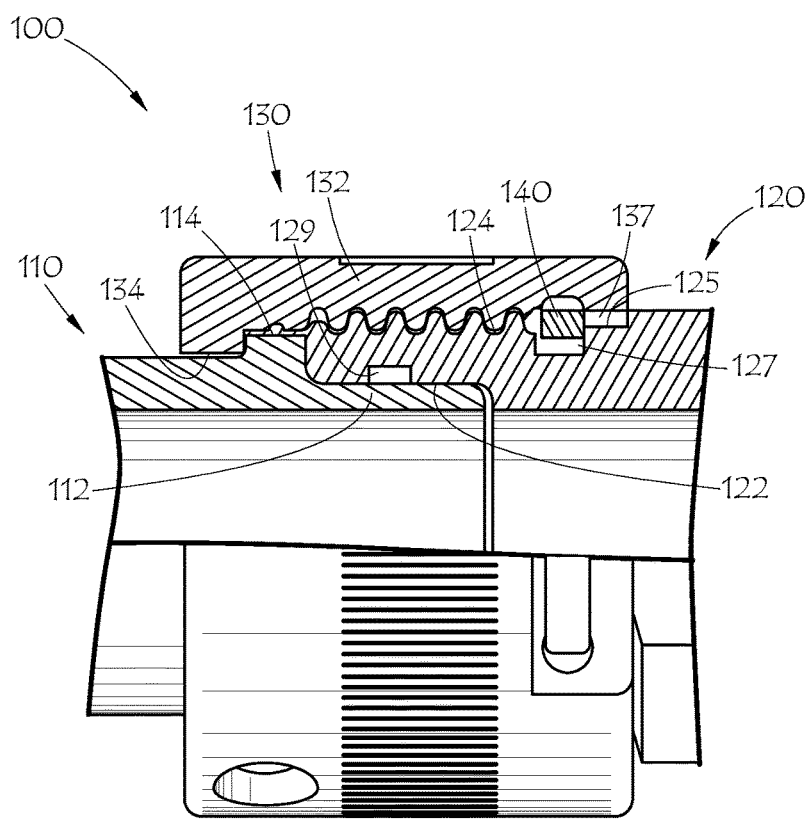
FIG. 4 is a cut-away view of a coupling system according to an embodiment.

FIG. 4 is a cut away view of a portion of coupling system 100, according to an embodiment. As can be seen in this embodiment, retaining member 130 includes threads 132 which threadingly engage threads 124 of female portion 120. This configuration does not allow retaining member 130 to unthread from female portion 120 when locking member 140 is in place between lip 137 and the side of groove 127 near the threads 124.

Insert portion 112 of male portion 110, generally fits within, and is coupled to, receptacle portion 124 of female portion 120. A first side of boss 114 may generally abut and/or be adjacent to female portion 120. A second side of boss 114 may abut or generally be adjacent to abutment portion of retaining member 130. The threading of retaining member 130 with female portion 120 may move and/or generally secure male portion 110 to female portion 120 and retaining member 130, via abutment portion 134.

Another embodiment of the invention is shown in FIG. 5 to illustrate some of the variations possible within the scope of the invention. Coupling system 200 includes male portion 210, coupled to female portion 220, held together by retaining member 230. As discussed above, locking member 240 is in the form of a cable seal with extending cable 242 threaded through tangential holes 236 with seal or tag 246 preventing unwanted removal and as additional visual indication the coupling is secure. Wrenching section 239 on retaining member 230 takes the form of a series of notches which may be suitable for use of a spanner wrench. Wrenching section 226 on female portion 220 takes the form of a hex nut. Retainer orifices in the form of tangential holes 236 are also shown on retaining member 230 in FIG. 6.

Figure 6:
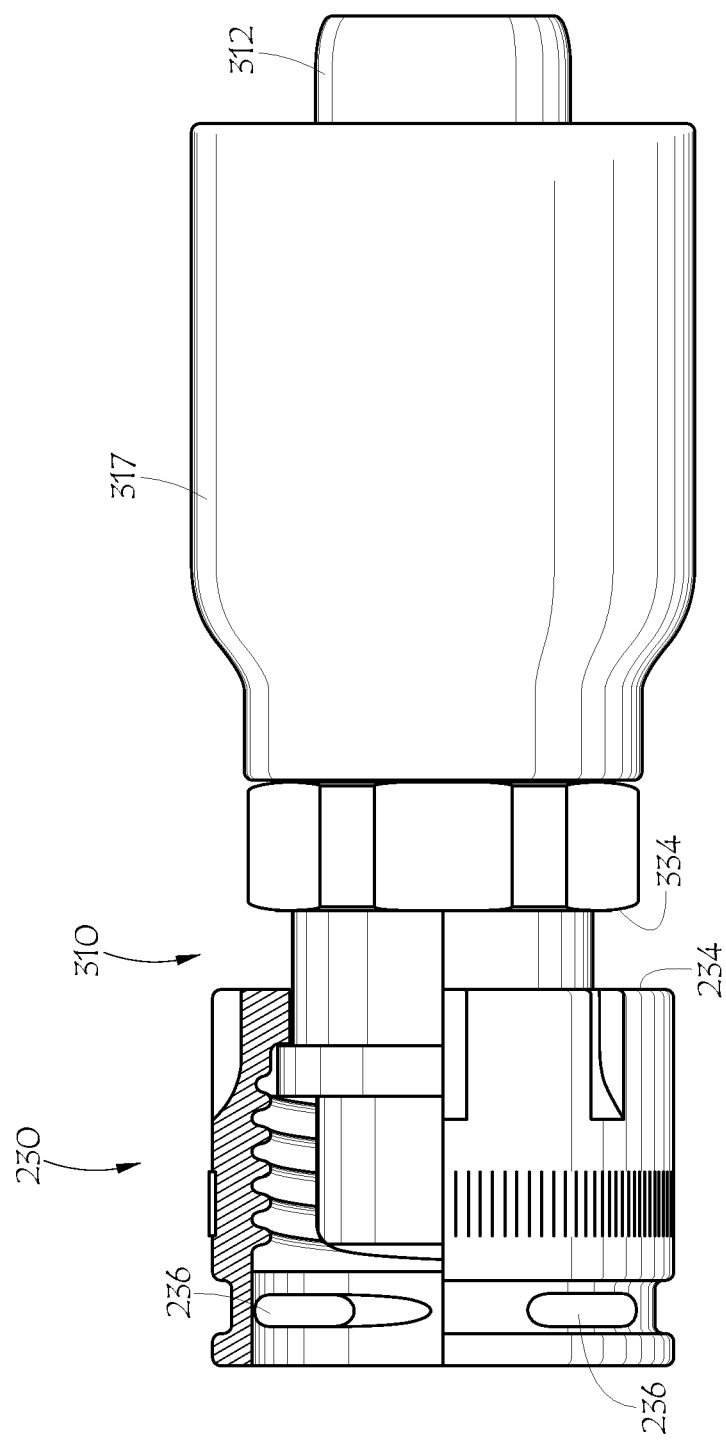
FIG. 6 is a cut-away view of a male portion and retaining member according to another embodiment.

FIG. 6 shows an embodiment with male portion 310 having a hose receiving portion which includes hose barb 312 and ferrule 317. Retaining member 230 may be slid over male portion into the position shown. Then ferrule 317 may be staked or swaged or otherwise attached in place as shown. The rear face 234 of retaining member 230 is in fairly close proximity to and opposes the front face 334 of the ferrule. Thus, when retaining member 230 is unthreaded from a coupled female portion, rear face 234 will abut front face 334 and thereby draw the male portion out of the female portion thus disconnecting the coupling. Other arrangements for connection to pipes, hose or manifolds may be envisioned which provide the abutment needed to draw the male portion out of the female portion when the retaining member is unthreaded, such as a two-piece, stake-collar and ferrule arrangement. On the other hand, the hose receiving portion could be threaded for receiving a hydraulic fitting with mating threads. Generally, if the threads are male threads on the hose receiving portion, any mating female fitting that connects via such male threads on the connection portion may have a face equivalent to face 334 which can abut the end 234 of the retaining portion and thus facilitate disconnection. As an alternate to relying on connected fittings, there may instead be a C-clip or other retaining clip or feature attached to the male portion which is specifically adapted to abut the end 234 of retaining portion 230 in order to facilitate disconnection of the coupling.

Figure 7:
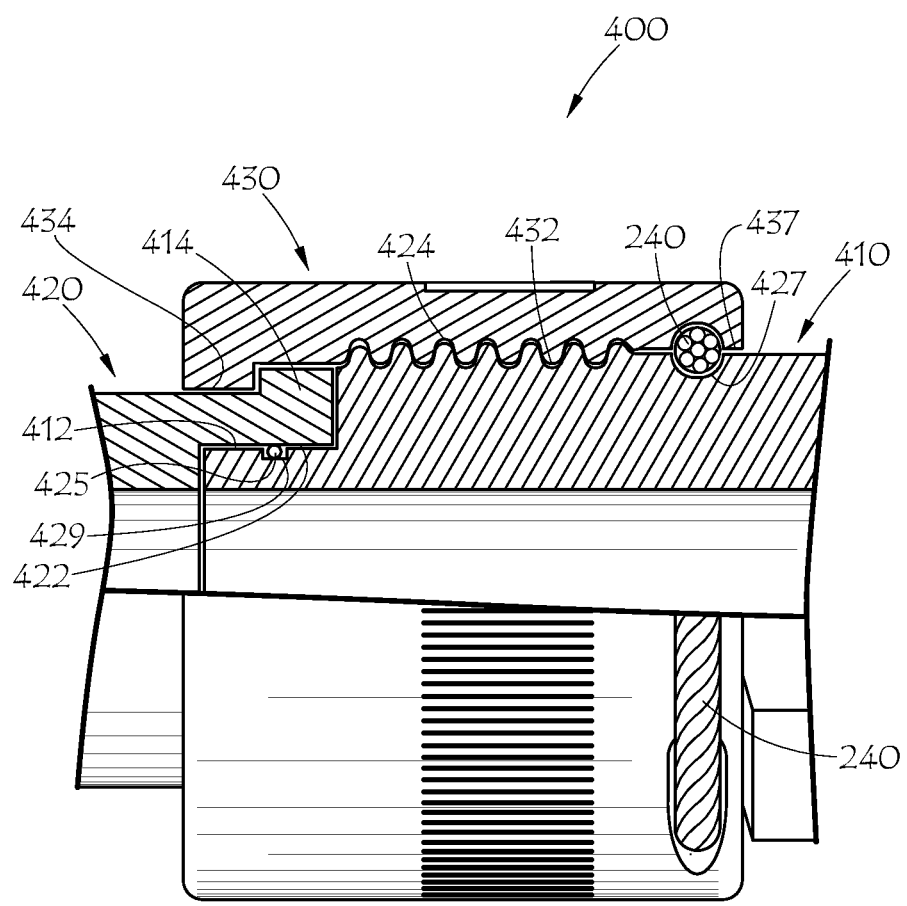
FIG. 7 is partially fragmented view of a coupling system according to another embodiment.

FIG. 7 shows an embodiment of the invention in which the external threads which correspond to the retaining member are on the male portion. In FIG. 7, coupling system 400 includes male portion 410, female portion 420 and retaining member 430. Female portion 420 has receptacle portion 422. Insert portion 412 of male portion 410 fits into receptacle portion 422 with O-ring 425 housed in seal retaining groove 429 on insert portion 412. The O-ring thus provides a seal between the male and female portions. Retaining member 430 has internal threads 432 which mate with external threads 424 on male portion 410. Retaining member 430 has abutment portion 434 which abuts boss 414 when slipped over female portion 420. Thus when retaining member 430 is threadingly engaged with the threads 424 on male portion 410, the male portion may be drawn into sealing engagement with female portion 420. When fully engaged, locking member 240, shown as a cable tie, may be inserted through holes or openings or orifices in retaining member 430 and thus threaded around the coupling in a passageway defined by or between groove 427 on male portion 410 and lip 437 on retaining member 430. Note that features shown for other embodiments may be adapted for this embodiment and vice versa, including seal placement(s) and type(s), hose receiving portion(s), connection portion(s), wrenching section(s) or portion(s), knurling, orifice style, locking member type, and indication portion.

In use, to connect an embodiment of the inventive coupling system, the retaining member may be hand-tightened to pull the male sealing surface into the female with the seal there between. To keep the retaining member from backing off, the cable tie or other locking member is inserted through holes in the retaining member into a groove in the female (or male, depending on the embodiment) and locked. To disconnect, the cable may be cut and/or pulled out and removed so that the retaining member can be loosened. Unlike conventional staple-lock mine couplings, for example, the cable or locking member does not carry the pressure load. The threads carry the pressure load and therefore the design is capable of much higher pressure rating than a staple-lock coupling of similar diameter. If the retaining member happens to back off enough during operation to resist the locking member pulling out, simply tightening the retaining member farther will eliminate this resistance. Once the cable (or other locking device) is removed, loosening or unthreading the retaining member may separate the fitting. If necessary, a spanner wrench or other suitable tool may be used to turn the retaining member and release the fitting. The threaded retaining member may even provide enough mechanical advantage to overcome the resistance of debris and corrosion present at assembly or disassembly by hand.

Coupling system 100, 200, 400 or other embodiment of the invention may overcome many issues of other threaded connections, such as assuring adequate preload in the retaining member to overcome the pressure load, easily damaged threads, and having no visual indication of complete connection. It also overcomes issues in non-threaded designs, such as high insertion force, unprotected seals, poor impulse performance, and installation of heavy locking devices such as hammer unions, clamshells or thick staples. The advantages of the invention include the ease of hand tightening or loosening, the greater safety factor of threads over conventional staples, no torque required to seal and hold, and less mass required to achieve a given rating.

Furthermore, this system may be used with lower pressure systems. This may allow the use of less expensive materials and configurations. The system may be configured to connect hose, pipes, fittings, manifolds or the like.

Systems disclosed herein may be used with, but are not limited to, 2-4" chemical hose, and/or with volume control regulators. The inventive coupling system offers advantages over hammer unions in the oil field industry, including those used for cementing hose, slim hole rotary hose, and the like.

It should be noted that other types of locking methods may optionally be used instead of the preferred locking member described above. For example, the locking member could be a c-clip inserted in a suitable groove adjacent a suitable flange. The locking method could be a frictional engagement, or it could be a bayonet style engagement or a latch, or multiple bayonets or latches.

Although the present disclosure and its advantages have been described in detail, it should be understood that various changes, substitutions, and alterations can be made herein without departing from the scope of the disclosure as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. The disclosure disclosed herein may suitably be practiced in the absence of any element that is not specifically disclosed herein.

What is claimed is:

1. A coupling system comprising:
a male portion with a right-cylindrical male sealing surface;
a unitary, one-piece, female portion with a right-cylindrical female sealing surface;
a hand-tightenable threaded retaining member which draws said male portion into said female portion with a non-interference-type fit when threadingly engaged;
a seal which is retained between said cylindrical male and female sealing surfaces when said retaining member is so threadingly engaged; and
a locking feature comprising: an orifice through said retaining member, a circumferential locking groove in an outer cylindrical surface of one of said male portion and said female portion, and a locking member with an extension which extends through said orifice and engages in said locking groove and thus locks said hand-tightenable retaining member to prevent it from unthreading when so threadingly engaged;
wherein said retaining member comprises a lip arranged so that said locking member inhibits said unthreading when said extension is in place between said lip and a side of said locking groove.

2. The coupling system of claim 1 wherein said retaining member comprises internal threads and said female portion comprises corresponding external threads which so threadingly engage.

3. The coupling system of claim 2 wherein said retaining member comprises an abutment portion that abuts a boss of said male portion and thereby draws said male portion into sealing engagement with said female portion as it is so threadingly engaged.

4. The coupling system of claim 3 wherein said male portion comprises a cylindrical insert portion comprising said cylindrical male sealing surface, said insert portion configured to matingly couple to a cylindrical receptacle portion comprising said cylindrical female sealing surface of said female portion of said coupling system.

5. The coupling system of claim 4 wherein said seal comprises an O-ring seal.

6. The coupling system of claim 2 wherein said locking groove extends around the entire outside circumference of the female portion.

7. The coupling system of claim 1 wherein said retaining member comprises internal threads and said male portion comprises corresponding external threads which so threadingly engage.

8. The coupling system of claim 7 wherein said retaining member comprises an abutment portion that abuts a boss of said female portion and thereby draws said female portion into said sealing engagement with said male portion as it is so threadingly engaged.

9. The coupling system of claim 7 wherein said locking groove extends around the entire outside circumference of the male portion.

10. The coupling system of claim 1 wherein said orifice is formed through said retaining member approximately tangent to said locking groove.

11. The coupling system of claim 10 wherein said locking feature comprises at least four of said orifices formed through said retaining member approximately tangent to said locking groove.

12. The coupling system of claim 11 wherein said locking member comprises a cable or cable tie threaded through four or more of said orifices and engaging said locking groove when applied.

13. The coupling system of claim 10 wherein said locking feature comprises a plurality of said orifices; and wherein said locking member comprises a cable or cable tie threaded through at least two of said orifices and around the coupling in a passageway defined by or between said locking groove and said retaining member.

14. The coupling system of claim 10 wherein said locking feature comprises a plurality of said orifices; and wherein said locking member comprises a cable or cable tie threaded through at least two of said orifices and around the coupling in a passageway defined by or between said locking groove and said lip.

15. A coupling system, comprising:
a retaining member;
a female portion comprising a right-cylindrical receptacle portion, an outer cylindrical surface, and a circumferential locking groove in said outer cylindrical surface;
a male portion comprising a right-cylindrical insert portion configured to matingly couple with a non-interference-type fit to said cylindrical receptacle portion of said female portion of said coupling system, wherein said male portion extends through said retaining member of said coupling system;
said retaining member comprising:
threads that threadingly couple to corresponding threads of said female portion,
an abutment portion that abuts a boss of said male portion and thereby pulls said male portion into said female portion as said threads and said corresponding threads are threadingly coupled, and
one or more retainer orifices; and
a locking member comprising an extension, said extension adapted for extending through said one or more retainer orifices of said retaining member, and further adapted for coupling with said locking groove of said female portion to inhibit unthreading of said threads and said corresponding threads;
wherein said retaining member comprises a lip arranged so that said locking member inhibits said unthreading when said extension is in place between said lip and a side of said locking groove.

16. The coupling system of claim 15, wherein said retaining member further comprises knurling.

17. The coupling system of claim 15, wherein said male portion further comprises a hose receiving portion capable of coupling to a hose, tube, pipe, and/or a manifold.

18. The coupling system of claim 15, wherein said female portion further comprises a connection portion capable of connecting said female portion to a hose, tube, pipe, and/or a manifold.

19. The coupling system of claim 15, wherein said female portion further comprises a wrenching section comprising at least one selected from a hex, a hole, a slot, a flat, and an orifice.

20. The coupling system of claim 15 wherein said female portion further comprises a seal groove capable of retaining a seal.

21. The coupling system of claim 20 further comprising a seal retained in said seal groove, wherein said seal comprises an O-ring.

22. The coupling system of claim 15 wherein said male portion further comprises a seal groove retaining an O-ring seal.

23. The coupling system of claim 15, wherein said locking member is adapted for coupling with said locking groove of said female portion while extending through said one or more retainer orifices only when said coupling system is sealingly engaged with said threads and said corresponding threads threadingly coupled, and further comprises an indication portion providing visual indication said coupling system is sealingly engaged.

24. The coupling system of claim 15 wherein said locking member comprises a cable or cable tie.

25. The coupling system of claim 15 wherein said locking groove extends around the circumference of the female portion.

26. The coupling system of claim 15 wherein said locking feature comprises a plurality of said orifices; and wherein said locking member comprises a cable or cable tie threaded through at least two of said orifices and around the coupling in a passageway defined by or between said locking groove and said lip.

27. The coupling system of claim 15 wherein said female portion is a single, monolithic, unitary piece, and not a collection of pieces functioning as a unit.

28. A method of using the coupling system of claim 15 for coupling one or more hoses, comprising:
providing the coupling system of claim 15;
extending said male portion through said retaining member so that an abutment portion of said retaining member abuts a boss of said male portion;
threadingly coupling internal threads on said retaining member to corresponding external threads on said female portion, whereby said retaining member draws said male portion into sealing engagement with said female portion; and
engaging said locking member by inserting an extension of said locking member through a retainer orifice of said retaining member into a circumferential locking groove in an outer surface of said female portion thereby inhibiting unthreading of said threads and said corresponding threads.

29. The method of claim 28, further comprising creating a seal between said male and female portions at least in part via a seal groove in said receptacle portion.

30. The method of claim 29, wherein said creating a seal further comprises a seal generally configured to be retained in said seal groove.

31. The method of claim 28, further comprising tightening fully by hand via knurling when threadingly coupling said retaining member and said female portion.

32. The method of claim 28, further comprising coupling said male portion to a hose, pipe and/or a manifold via a hose receiving portion of said male portion.

33. The method of claim 28, further comprising coupling said female portion to a hose, pipe and/or a manifold via a connection portion of said female portion.

34. The method of claim 28, further comprising torqueing said female portion via a wrenching section.

35. The method of claim 28, further comprising indicating said coupling system is engaged at least in part using an indication portion of said locking member.

* * * * *